Sept. 27, 1949.　　　S. NIEDELMAN ET AL　　　2,483,060
DRILL POSITIONING MECHANISM

Filed Dec. 19, 1945　　　　　2 Sheets-Sheet 1

INVENTORS:
Samuel Niedelman
and Manfred Rauscher
BY

Martin T. Fisher,
Attorney.

Sept. 27, 1949.  S. NIEDELMAN ET AL  2,483,060
DRILL POSITIONING MECHANISM
Filed Dec. 19, 1945  2 Sheets-Sheet 2

INVENTORS:
Samuel Niedelman
and Manfred Rauscher
BY
Martin T. Fisher,
Attorney.

Patented Sept. 27, 1949

2,483,060

UNITED STATES PATENT OFFICE 2,483,060

DRILL POSITIONING MECHANISM

Samuel Niedelman, New York, N. Y., and Manfred Rauscher, Arlington, Mass., assignors to Avitecnica, Inc., New York, N. Y., a corporation of New York Application December 19, 1945, Serial No. 635,913

10 Claims. (Cl. 77—55)

This invention relates to drill centering guides and more particularly to drill centering guides for use in drilling both curved and flat surfaces.

When drilling curved surfaces with the usual motor driven drill, it is difficult for the operator to hold the drill at a right angle to the work. There has long been a need for a drill centering guide for attachment to a motor driven drill and which has a plurality of contact points at its lower end for engaging curved or flat surfaces with equal facility and accuracy. The present invention has solved this problem.

This invention provides a drill centering guide comprising a plurality of contact points for engaging curved and flat surfaces; it has a plurality of standards extending upwardly from the contact points and supporting a bracket for holding a drill operating mechanism in such a manner that the drill may be forced into the work along a straight line at a right angle to the surface of the work. Where a curved surface is involved, the drill is usually to be held perpendicular to the tangent to such surface at the point of drilling.

The invention comprises a drill guide having four contact points arranged in two pairs, each pair of contact points being movable in a direction to or from the work, independently of the other pair of contact points. In this manner the drill centering guide is adapted for drilling work surfaces which are flat or curved, and where the curved surface may be convex or concave, with a simple or compound curvature.

The new drilling guide also has a variably positionable carriage for the drill, which can be set at the proper distance from the work, in accordance with the length of drill used.

The invention will be further described in the following detailed description of a preferred embodiment thereof, taken in conjunction with the accompanying drawings, in which.

Figure 4:
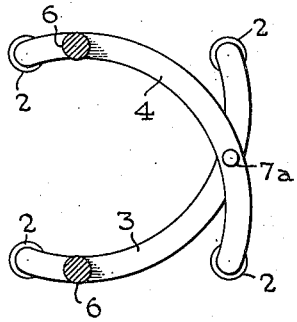
Figure 4 is a view in sectional plan view, on line 4—4 of Figure 1.

Referring now to these drawings, the drill centering guide of this invention comprises a plurality of work engaging contact points 2, arranged in two pairs, one pair being carried by a lower curved bar 3 and the other pair by an overlapping or crossing upper curved bar 4. These bars might also be arranged at the same level in their neutral positions, with one bar passing through a gap or a slot in the other bar. The contact points 2, are preferably accurately made and accurately positioned balls, but, of course, may be of other shapes, such as actually pointed. These contact points are mounted on legs 5. These four contact points, considered in plan, as in Figure 4, are positioned approximately at the corners of a square, in the preferred construction, but may more generally be at the corners of a rectangle.

Figure 1:
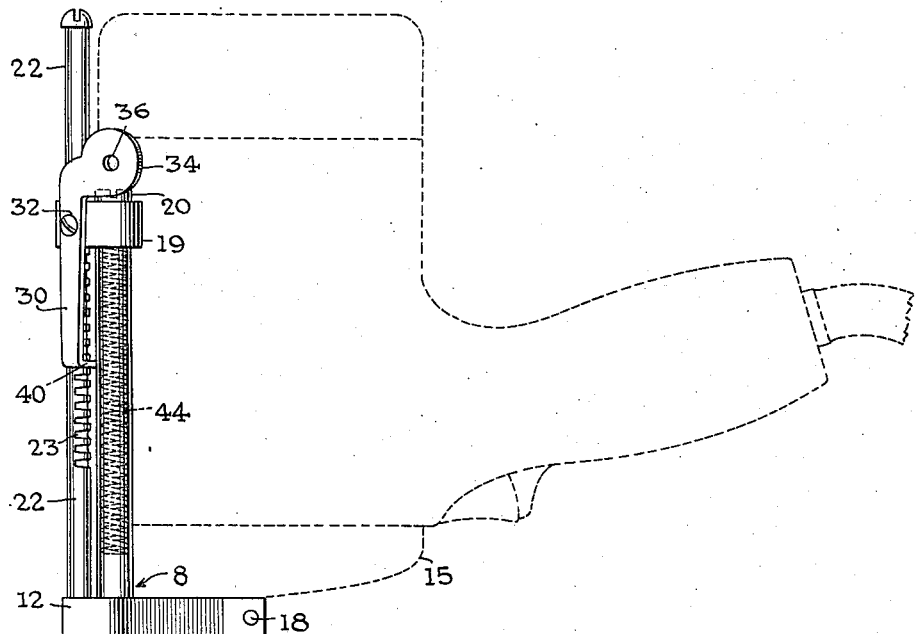
Figure 1 is a side elevational view of the drill centering guide, with the drill and operating mechanism therefor shown in dotted lines.
Figure 1:
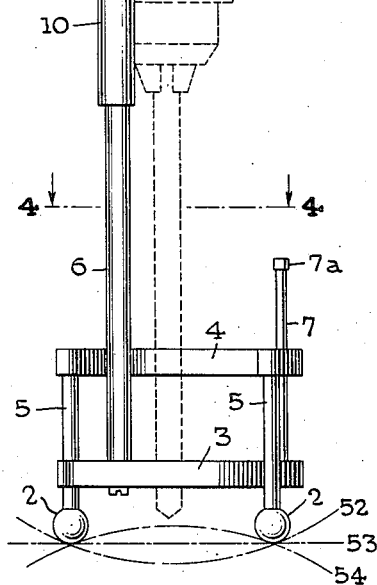
Figure 2:
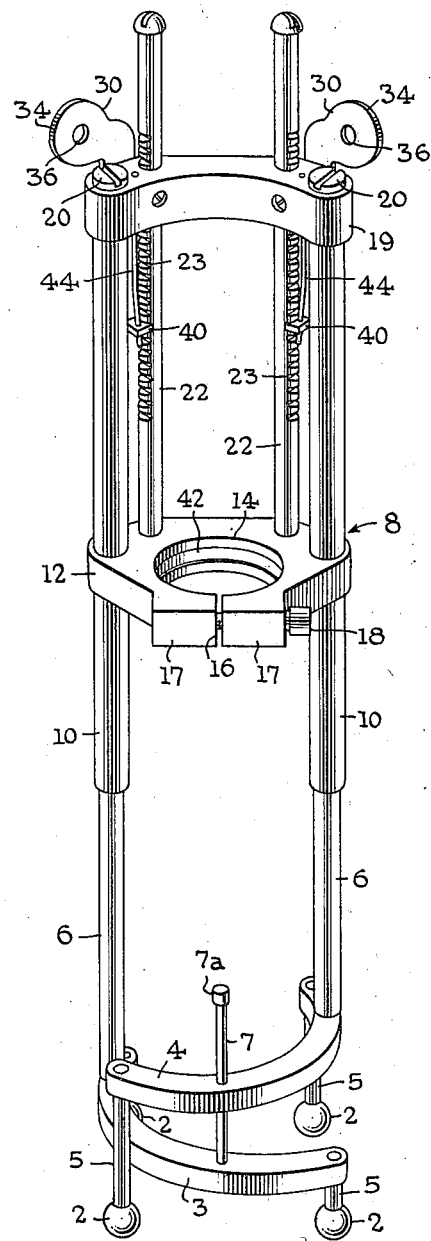
Figure 2 is a front perspective view of the centering guide.
Figure 3:
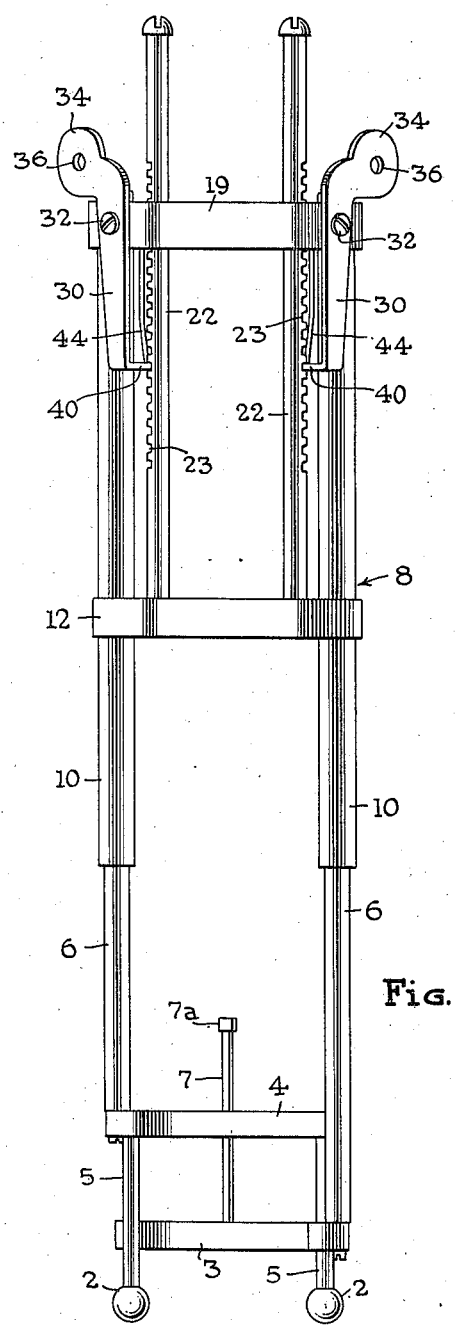
Figure 3 is a rear elevation of the centering guide.

Curved bars 3 and 4 are carried independently by standards 6, the standards themselves being independently movable up and down, so that one bar, such as 3 or 4, with its contact points, is variably positionable with respect to the other bar and its contact points. This feature is quite important. While contact-point-supporting bars 3 and 4 are independently variably positionable up and down with respect to each other, as just mentioned, the paths of travel of the several contact points are parallel, and as shown in Figures 1 and 3, are usually vertical. Such movement is effected by providing a vertical aligning pin 7, fixed to bar 3, and passing slidably through an accurately drilled hole in bar 4. A cap 7a limits the extent of downward movement of bar 3 relative to bar 4 and so prevents a disengagement of the linkage formed by the two bars. Parallel movement of standards 6 is also achieved by their being slidably mounted in parallel sleeves 10 of a drill supporting carriage, indicated generally at 8. Referring to Figures 2 and 3, the upper two-thirds of these figures forms the drill supporting carriage 8, which carriage slides downwardly on standards 6 as the drill drills its hole, as will be described.

The drill carriage 8 comprises sleeve members 10 slidably mounted in a drill supporting bracket 12, the sleeves sliding in suitable apertures in the bracket. Bracket 12 is provided with a hole 14 for receiving the lower part of drill holding and operating mechanism 15, including the usual electric or pneumatic motor. Opening 14 may be made variable in size by a cut, as at 16, defining two lugs 17 engageable by a set screw 18.

Carriage 8 also includes a heavy, curved top bar 19, in which the upper ends of sleeves 10 are mounted and secured by screws 20.

Bracket 12 being slidably mounted on sleeves 10, a drill supported therein may quickly be moved to and from the work. It may be locked at any desired level with respect to sleeves 10 by means of a pair of vertical rods 22, the lower ends of which are fastened in bracket 12, and the upper ends of which slidably engage curved top bar 19, in suitable apertures therein. Rods 22 are provided with locking notches 23. The locking means further comprises latches 30 pivotally mounted on top bar 19 by screws 32. Latches 30 have handles 34 at their upper ends which the operator may grasp; these handles may be further provided with holes 36 therein to enable the operator to insert a nail or other instrument into the handle for obtaining a firmer grip for operating the latches.

The lower ends of the latches 30 are provided with bent portions 40 at right angles thereto for engagement with the notches 23 in the adjusting rods 22. Springs 44, mounted on the lower side of the bar 19 extend downwardly and through the bent portion 40 of the locks 30 to hold the bent portion 40 firmly in engagement with a particular notch 23 of the corresponding rod 22.

The drilling tool-passage 14 of bracket 12 may have a groove 42 in its surface for allowing the bracket 12 to firmly grip the drill operating mechanism with substantially a double line contact.

Coiled springs 44 are provided in the sleeve members 10, being confined therein between screws 20 and the upper ends of standards 6. The drill mechanism is supported by bracket 12, and also bears against the curved top bar 18. Downward pressure on the drill moves the drill toward and into the work, against the pressure of springs 44.

Before describing the operation in detail, it may now be pointed out that the drill supporting bracket 12 is movable up and down as a unit on sleeves 10, in order to move the drill to the work, and that it may be latched at the desired level by latches 30, in accordance with the length of drill being used. Then the entire carriage 8 may be moved downwardly on standards 6 to force the drill into the work.

In operation, the drill operating mechanism 15 is inserted in the bracket 12, with the upper part against top bar 19. Latches 30 are released from notches 23, and the drill moved down toward the work, locking rods 22 moving down at the same time. When the drill point gets close to the work, latches 30 are released and their springs 44 cause them to engage the notches in rods 22 and lock at that level. The operator now checks carefully to see that all four contact points 2 are in contact with the work surface, whether that surface is flat or curved. With four contact points arranged in two independently positionable pairs, as described, a firm and accurate positioning of the drill with respect to the work is achieved, whether the work surface is flat, convex or concave, or of a simple or compound curvature. This accurate positioning results from having two pairs of contact points, independently positionable, with the bar supporting one pair straddling the bar supporting the other pair, so that the four points, in plan view, are at diagonally opposite corners of a four sided figure, as in Figure 4. The drill is usually positioned perpendicular to the tangent to the curved surface at the point where the hole is drilled. Power is then applied to the drill motor, and the entire carriage 8 is pushed down toward the work on standards 6 as the hole is drilled, against the pressure of springs 44.

Because of the independent movement of each pair of contact points 2, the drilling guide is adapted for engaging surfaces of either a concave, a convex, or a flat nature, as represented by the lines 52, 53 and 54, respectively, in Figure 1.

When engaging a curved surface one pair of the two pairs of contact points 2 will in general be above the level of the other pair.

It will be seen that more than two sets of contact points may be used; and a greater number of standards, sleeves, adjusting rods, and locks may be used, and such changes are within the scope of the invention.

It should be understood that while the centering device of this invention is particularly for holding and centering a drill and its operating mechanism, it is of more general application and could be used also for centering tools generally, for riveting devices, percussion tools, marking mechanism, etc.

The foregoing description of the invention is for illustrative purposes only and it should be understood that the invention is not to be limited to the precise details shown, but may be carried out in other ways.

We claim as our invention:

1. Drill positioning mechanism, comprising a pair of independently movable supporting standards, a pair of spaced, work-engaging contact points carried by each standard, means cooperating with said standards and contact points for limiting the movement of said contact points to parallel paths, one pair of said contact points being positioned at diagonally opposite corners of a rectangle, while the other pair is positioned at the other two diagonally opposite corners of said rectangle, and bracket means, carried by and serving to brace said standards, for holding a drill operating mechanism or the like.

2. Drill positioning mechanism comprising a pair of standards, a drill holding bracket and guide carried by said standards, a transversely extending supporting bar carried by the lower part of each standard, and a pair of work-engaging contact points carried by each supporting bar, the two contact points carried by one of said supporting bars engaging the work at diagonally opposite corners of a square while the other two contact points carried by the other supporting bar engage the work at the other two diagonally opposite corners of said square, and means cooperating with said bars for restricting the movement of said contact points to parallel paths.

3. Drill positioning mechanism, comprising a standard, a transverse supporting bar carried by the lower part of said standard, a pair of work-engaging contact points carried by said supporting bar, a second standard, a transverse supporting bar carried by the lower part of said standard, a drill holding bracket and guide carried by said standards, a pair of work-engaging contact points carried by said second supporting bar, one of said supporting bars crossing over the other bar for thereby positioning its pair of contact points at diagonally opposite corners of a rectangle with respect to the other pair of contact points, and means cooperating with said bars for restricting the movement of said contact points to parallel paths.

4. Drill positioning mechanism, comprising a pair of standards, a transversely extending supporting bar carried by the lower part of each standard, a pair of work-engaging contact points carried by each supporting bar, one of said supporting bars crossing the other bar for thereby positioning its pair of contact points at diagonally opposite corners of a square, while the other two contact points are at the other two diagonally opposite corners of said square, means cooperating with said bars for restricting the movement of said contact points to parallel paths, and a drill holding bracket and guide with which said standards are slidably engaged.

5. Drill positioning mechanism, comprising a pair of standards, a transversely extending supporting bar carried by the lower part of each standard, a pair of work-engaging contact points carried by each supporting bar, one of said supporting bars crossing over the other for thereby positioning the pairs of contact points carried by the respective bars at diagonally opposite corners of a rectangle, means cooperating with said bars for restricting the movement of said contact points to parallel paths, and a support in which said standards are slidably and resiliently mounted.

6. Drill positioning mechanism, comprising a pair of standards, a transversely extending supporting bar carried by the lower part of each standard, a pair of work-engaging contact points carried by each supporting bar, one of said supporting bars crossing over the other for thereby positioning the pairs of contact points carried by the respective bars at diagonally opposite corners of a square, means cooperating with said bars for restricting the movement of said contact points to parallel paths, supports in which said standards are slidably and resiliently mounted, and a drill holding bracket engaged with said supports and serving to hold them in position.

7. Drill positioning mechanism, comprising a pair of standards, a transversely extending supporting bar carried by the lower part of each standard, a pair of work-engaging contact points carried by each supporting bar, one of said supporting bars crossing over the other for thereby positioning the pairs of contact points carried by the respective bars at diagonally opposite corners of a square, means cooperating with said bars for restricting the movement of said contact points to parallel paths, supports in which said standards are slidably and resiliently mounted, a drill bracket slidably mounted on said supports and serving to hold them in position and means for positioning said drill bracket at various levels.

8. Drill positioning mechanism, comprising a pair of independently movable supporting standards, a supporting bar at the lower end of each standard, said bars crossing at different levels, a contact point mounted on each end of each of said bars, the two contact points on one bar being located at diagonally opposite corners of a rectangle, the other two contact points being located at the other two diagonally opposite corners of said rectangle, means cooperating with said bars for restricting the movement of said contact points to parallel paths, and bracket means, carried by said standards, serving to hold them apart and to support a drill and its operating mechanism.

9. Drill positioning mechanism, comprising a pair of independently movable supporting standards, a supporting bar at the lower end of each standard, said bars crossing at different levels, a contact point mounted on each end of each of said bars, the two contact points on one bar being located at diagonally opposite corners of a rectangle, the other two contact points being located at the other two diagonally opposite corners of said rectangle, means cooperating with said bars for restricting the movement of said contact points to parallel paths, bracket means, carried by said standards, serving to hold them apart and to support a drill and its operating mechanism and means for setting and locking said bracket means at any desired height.

10. Drill positioning mechanism, comprising a pair of independently movable supporting standards, a supporting bar at the lower end of each standard, said bars crossing at different levels, a contact point mounted on each end of each of said bars, the two contact points on one bar being located at diagonally opposite corners of a rectangle, the other two contact points being located at the other two diagonally opposite corners of said rectangle, means cooperating with said bars for restricting the movement of said contact points to parallel paths, bracket means, carried by said standards, serving to hold them apart and to support a drill and its operating mechanism, means for setting and locking said bracket means at any desired height, and spring means for urging said contact points toward the work.

SAMUEL NIEDELMAN.
MANFRED RAUSCHER.

REFERENCES CITED

The following references are of record in the file of this patent:

UNITED STATES PATENTS

| Number | Name | Date |
| --- | --- | --- |
| 901,152 | Churchill | Oct. 13, 1908 |

FOREIGN PATENTS

| Number | Country | Date |
| --- | --- | --- |
| 588,454 | France | Jan. 31, 1925 |